(12) United States Patent
Rost et al.

(10) Patent No.: US 9,717,029 B2
(45) Date of Patent: Jul. 25, 2017

(54) RADIO ACCESS MANAGEMENT SYSTEM AND METHOD

(71) Applicant: NEC EUROPE LTD., Heidelberg (DE)

(72) Inventors: Peter Rost, Heidelberg (DE); Johannes Lessmann, Sandhausen (DE)

(73) Assignee: NEC CORPORATION, Tokyo (JP)

( * ) Notice: Subject to any disclaimer, the term of this patent is extended or adjusted under 35 U.S.C. 154(b) by 7 days.

(21) Appl. No.: 14/783,469

(22) PCT Filed: Apr. 12, 2013

(86) PCT No.: PCT/EP2013/057670
§ 371 (c)(1),
(2) Date: Oct. 9, 2015

(87) PCT Pub. No.: WO2014/166544
PCT Pub. Date: Oct. 16, 2014

(65) Prior Publication Data
US 2016/0037422 A1 Feb. 4, 2016

(51) Int. Cl.
*H04W 36/22* (2009.01)
*H04W 36/08* (2009.01)
*H04W 92/12* (2009.01)

(52) U.S. Cl.
CPC ........... *H04W 36/22* (2013.01); *H04W 36/08* (2013.01); *H04W 92/12* (2013.01)

(58) Field of Classification Search
CPC ...... H04W 36/22; H04W 36/08; H04W 92/12
See application file for complete search history.

(56) References Cited

U.S. PATENT DOCUMENTS

| 8,243,679 B1 * | 8/2012 | Huang | ......... H04W 36/30 370/331 |
| 2009/0069004 A1 | 3/2009 | Ergen et al. | |

(Continued)

FOREIGN PATENT DOCUMENTS

WO    WO 2009067297 A1    5/2009

OTHER PUBLICATIONS

Sharp: "How does any source node get to know the backhaul link information of a possible target relay node prior to a handover", 3GPP Draft; R2-100580, 3$^{rd}$ Generation Partnership Project, vol. RAN WG2, No. Valencia, Spain; Jan. 18, 2010, Jan. 13, 2010 (Jan. 13, 2010), XP050421164, the whole document.

(Continued)

*Primary Examiner* — Brian D Nguyen
(74) *Attorney, Agent, or Firm* — Leydig, Voit & Mayer, Ltd.

(57) ABSTRACT

A radio access management system includes a radio access network including a number of base stations, a backhaul network to which the base stations are connected via backhaul links, and a backhaul resource controller configured to acquire information about both the load of the radio access network and of the backhaul network and to at least one of suggest or enforce handovers of user terminals connected to the base stations based on the acquired load information.

19 Claims, 2 Drawing Sheets

(56) References Cited

U.S. PATENT DOCUMENTS

| | | | | |
|---|---|---|---|---|
| 2010/0054185 | A1* | 3/2010 | Kaneko | H04W 24/00 370/328 |
| 2012/0076027 | A1* | 3/2012 | Akyildiz | H04L 41/5025 370/252 |
| 2012/0087276 | A1* | 4/2012 | Huang | H04B 7/155 370/253 |
| 2012/0093059 | A1* | 4/2012 | Bai | H04L 5/0007 370/312 |
| 2012/0093063 | A1* | 4/2012 | Yuan | H04L 5/0053 370/315 |
| 2013/0003548 | A1* | 1/2013 | Sridhar | H04L 47/125 370/235 |
| 2013/0021962 | A1* | 1/2013 | Hu | H04W 48/20 370/315 |
| 2013/0163424 | A1* | 6/2013 | Goerke | H04W 24/02 370/235 |
| 2014/0160937 | A1* | 6/2014 | Richards | H04W 12/06 370/236 |

OTHER PUBLICATIONS

3GPP TS 36.423 V11.4.0, $3^{rd}$ Generation Partnership Project; Technical Specification Group Radio Access Network; Evolved Universal Terrestrial Radio Access Network (E-UTRAN); X2 application protocol (X2AP) (Release 11), 3GPP Draft, Mar. 11, 2013 (Mar. 11, 2013), XP050700399, Retrieved from Internet: URL: http://www-3gpp.org/ftp/tsg_ran/WG3_lu/Draft_Specs/TSG-RAN59/.

ETSI TS 137 320 V11.2.0 (Feb. 2013), Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 11.2.0 Release 11), Feb. 2013.

ETSI TS 136 300 V11.4.0 (Feb. 2013), LTE; Evolved Universal Terrestrial Radio Access (E-UTRA) and Evolved Universal Terrestrial Radio Access Network (E-UTRAN); Overall description; Stage 2 (3GPP TS 36.300 version 11.4.0 Release 11), Feb. 2013.

* cited by examiner

RADIO ACCESS MANAGEMENT SYSTEM AND METHOD

CROSS REFERENCE TO RELATED APPLICATIONS

This application is a U.S. National Stage Application under 35 U.S.C. §371 of International Application No. PCT/EP2013/057670 filed on Apr. 12, 2013. The International Application was published in English on Oct. 16, 2014 as WO2014/166544 A1 under PCT Article 21(2).

FIELD

The present invention relates to a radio access management system and to a method for performing radio access management involving a radio access network including a number of base stations and a backhaul network to which said base stations are connected via backhaul links. Further, the present invention relates to a backhaul resource controller for supporting radio access management in a radio access network that includes a number of base stations that are connected to a backhaul network via backhaul links.

BACKGROUND

The last decades brought an exponential increase in mobile traffic volume. This will continue and a 1000-fold increase by 2020 has been forecasted. Small-cells are capable of enabling new services, increasing energy-efficiency, and reducing the costs of handling explosive data growth.

Due to strong inter-cell interference, small-cell deployments will require a higher degree of coordination than currently deployed systems. Small-cells may be deployed where it is difficult or too expensive to deploy fixed broadband access, optical fiber or line-of-sight (LOS) based microwave solutions for backhaul. The Broadband Forum (see http://www.broadband-forum.org for reference) reported that 30% of a mobile operator's OPEX today is spent for backhaul networks. Recently, wireless backhaul has received more attention due to its higher deployment flexibility and lower costs. The report "Wireless Backhaul: The Network Behind LTE, WiMAX, and 3G", In Stat, October 2010 shows that the expenditures for wireless backhaul will increase by 41% from 2009 to 2014. Hence, small-cell deployments must be connected by heterogeneous backhaul technologies that consist of fiber, microwave solutions, as well as other forms of wireless backhaul (for reference see NGMN Alliance (Next Generation Mobile Networks), "Next Generation Mobile Networks Optimised Backhaul Requirements," NGMN Alliance, August 2008).

So far, most radio access designs (including 3GPP architecture) consider the backhaul network to be sufficiently dimensioned (over-provisioned). While this is already challenging in today's backhaul networks, it might be even less true as we move towards small cells and more coordinated operation. Therefore, the backhaul must be considered as a limited resource when operating the radio access network. However, the 3GPP LTE mobile network architecture provides no means to take into account the underlying physical transport network and functional split of the physical implementation.

If a backhaul link is congested, this may be solvable in many cases by means of re-routing traffic over alternative paths if such exist. However, the closer to the base station, the less path diversity of the backhaul topology is typically available. Given two or more small cell base stations (or a combination of small cell and macro base stations) with overlapping coverage areas, the only remedy to relieve congested backhaul links might therefore be to enforce mobility of individual user terminals from one cell to another so that traffic destined for those terminals can be routed via a different and less congested part of the backhaul network.

In R. Ferrus, J. Olmos, and H. Galeana: "Evaluation of a cell selection framework for radio access networks considering backhaul resource limitations," IEEE International Symposium on Personal, Indoor and Mobile Radio Communications, Athens (Greece), September 2007, the authors discuss a cell selection framework for radio access networks which considers backhaul resource limitations. By means of an analytical framework, they show the benefits of taking into account backhaul limitations for the selection of radio access nodes. In fact, the document discloses the use of a very general formulation through a multi-dimensional Markov chain to show that treating all backhaul-resources as one pool of resources (trunk pool) will increase the overall capacity (trunking gain) that may be assigned to different cells.

WO 2009/067297 A1 discloses a cellular communication system that performs serving cell management in response to the backhaul loading of the base stations of the system. To this end, the base stations are equipped with a buffer including a plurality of sub-buffers for buffering backhaul data and with means for determining backhaul loading congestion. The system considers the backhaul load from a base station perspective, which renders the system rather inefficient and inflexible.

SUMMARY

In an embodiment, the present invention provides a radio access management system. The radio access management system includes a radio access network including a number of base stations, a backhaul network to which the base stations are connected via backhaul links, and a backhaul resource controller. The backhaul resource controller is configured to acquire information about both the load of the radio access network and of the backhaul network and to at least one of suggest or enforce handovers of user terminals connected to the base stations based on the acquired load information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
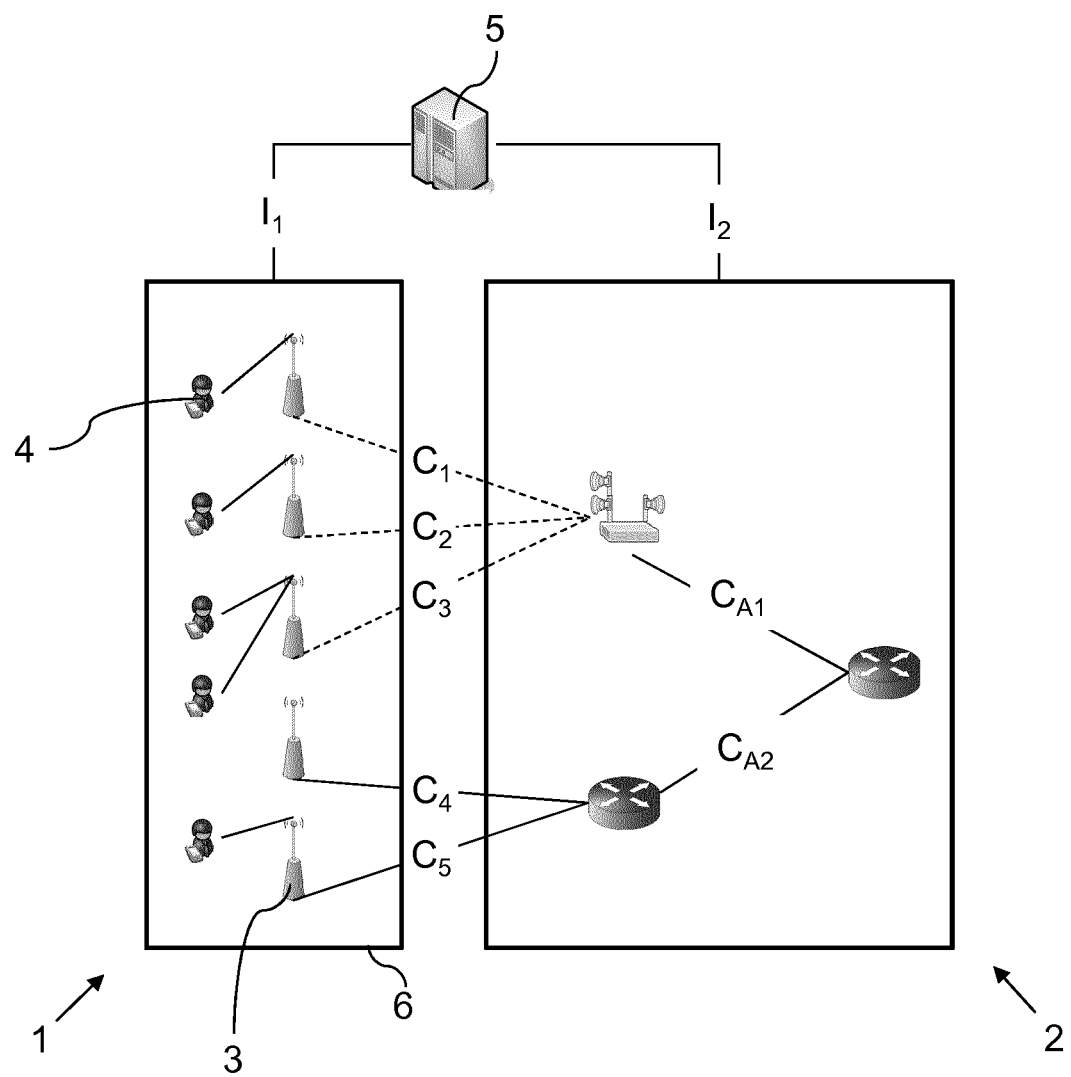
FIG. 1 is a schematic view of a radio access management system in accordance with an embodiment of the present invention.

In an embodiment, the present invention provides improvements and further developments to a radio access management system and a method for performing radio access management as well as to a backhaul resource controller for supporting radio access management in a radio access network in such a way that a more efficient and coordinated radio access and backhaul resource usage is enabled.

In an embodiment, a system is provided that includes a backhaul resource controller which is configured to acquire information about both the load of said radio access network and of said backhaul network and to suggest and/or to enforce handovers of user terminals connected to said base stations based on said acquired load information.

In an embodiment, method is provided that involves a backhaul resource controller that acquires information about both the load of said radio access network and of said backhaul network and that suggests and/or enforces handovers of user terminals connected to said base stations based on said acquired load information.

In an embodiment, a backhaul resource controller for supporting radio access management in a radio access network is provided, wherein the backhaul resource controller comprises a first interface for acquiring information about the load of said radio access network, a second interface for acquiring information about the load of said backhaul network, and an evaluator for evaluating said acquired load information and for suggesting and/or enforcing handovers of user terminals connected to said base stations based on said acquired load information.

According to the invention it has been recognized that a highly efficient and coordinated backhaul resource usage is achieved by deployment of a network entity that collects information, in particular load information, both from the radio access side as well as from the backhaul side. Such load information acquisition results in the ability to optimize jointly the backhaul and access network operation. In particular, according to the present invention the backhaul resource controller can prepare handover decisions taking into consideration the overall load situation. In this regard the backhaul resource controller can be regarded as a global entity overseeing the backhaul as a whole performing backhaul-information based radio access management. Consequently, the backhaul resource controller can, e.g., identify bottlenecks somewhere up in the backhaul which cannot be discovered by the base stations themselves.

With respect to the handover of user terminals from a source cell to a target cell it may be provided that the backhaul resource controller provides to the base stations under its control a causal information about backhaul and radio access network load before handover, while the handover is then performed by the base stations based on the information received from the backhaul resource controller. Alternatively, the backhaul resource controller may initiate handovers independently based on monitored backhaul traffic.

For instance, based on the joint information from radio access and backhaul network, the backhaul resource controller could decide to dynamically grant more capacity to particular base stations if they need it. So instead of base stations seeing the load and enforcing handovers in case their granted capacity is approaching critical thresholds, the base stations, according to embodiments of the present invention, could just communicate with the backhaul resource controller to negotiate whether more resources can be granted. Alternatively, the backhaul resource controller could grant the resources proactively. This allows much better coordination and much better resource usage. Consequently, the present invention is highly beneficial in small cell networks where backhaul is of particular importance. Furthermore, it enables the integration of backhaul-capacity-limited base stations into existing radio access networks.

The policies and objectives to be pursued by the backhaul resource controller may be preset or dynamically adapted, for instance by the operator of the radio access network. The present invention particularly addresses the problem of mobility, network-wide load balancing and energy efficiency controlled by a central entity. From a user perspective, improved load balancing will significantly improve the user experience. From an operator perspective, using non-ideal backhaul instead of expensive ideal backhaul results in considerable reductions of CAPEX and OPEX for the mobile network.

According to a preferred embodiment the backhaul resource controller may be connected via a first interface to at least a subset of the number of base stations, in particular to a local cluster of base stations. Advantageously, the first interface is implemented as a logical interface towards connected base stations, i.e. the backhaul resource controller will appear as logical base station (as described in the standardization document 3GPP TS 36.300 "Technical Specification Group Radio Access Network; Evolved Universal Terrestrial Radio Access (E-UTRA) and Evolved Universal Terrestrial Radio Access Network (E-UTRAN); Overall description, Release 11") towards the involved base stations. For instance, in 3GPP LTE the first interface may be implemented as the X2 interface, which will allow the backhaul resource controller to reuse already existing X2 information elements as coordination messages. Therefore, the backhaul resource controller does not need to be revealed towards the connected base stations. It is noted that the term "coordination messages" as used herein in connection with a 3GPP LTE architecture refers to messages exchanged between the backhaul resource control and the assigned cluster of base stations as well as the connecting backhaul network.

In order to enable the backhaul resource controller to acquire load information from the backhaul network, it may be provided that the backhaul resource controller is connected to the backhaul network via a second interface. Preferably, the first and the second interfaces are coordinated in such a way that, when the first interface connects the backhaul resource controller to a local base station cluster, the second interface connects the backhaul resource controller to the local backhaul infrastructure which delivers the data to that base station cluster.

According to a preferred embodiment the backhaul resource controller may be configured to assign a utility value to each of the base stations being under its control, wherein the utility value represents the acceptability or desirability of a particular of the base stations to accept further user terminals (for new connection requests or as part of handovers). The backhaul resource controller may perform feeding in of a utility value as a pre-step upon which the base station can then base its handover decisions, thereby resolving congestion on the backhaul network and increasing the actual throughput on the radio access network.

Generally, the utility value will be based on backhaul-motivated criteria such a backhaul load (on links directly or indirectly connected to the given base station) or energy saving goals, etc. According to a preferred embodiment the utility value assigned to a base station may relate to the relative load of backhaul links connecting to that base-station, as well as to the relative load of backhaul links connecting to adjacent base-stations. Furthermore, the utility value assigned to a base station may be determined by taking into consideration the absolute available load on backhaul links. Based on the provided utility value, various implications for the radio access network can be envisioned, among them, for instance, Scaling factor for measurements which are applied to measurement reports of user terminals in order to change the handover behavior, Changing handover parameters in order to reduce the amount of UEs that may connect to a cell while adjacent cells may accept more UEs, and/or A lower/upper bound for user traffic flows that may be accepted/rejected at a base station.

As part of the normal handover procedure, the base stations may take into consideration their assigned utility value in order to make backhaul-information based handover decisions. This is particularly the case, if the utility value was an existing standardized 3GPP protocol field (such as the S1 Transport Network Load Indicator for LTE).

According to a preferred embodiment the backhaul resource controller may be configured to use a coordination message which requests user terminal specific load information from a source cell. In this case, the base station of the source cell would send for all or a group of connected user terminals the current load information. The backhaul resource controller comprises an evaluator which then matches this load information with the available backhaul capacity as well as the available capacity in potential target cells. For instance, the base station of a source cell could provide a list of user terminals sorted according to the user terminals' load. In this case, the backhaul resource controller could initiate a handover for each user terminal one after the other. The process could be stopped as soon as the backhaul resource controller discovers that a particular objective, e.g. specified by the network operator, is achieved. The objective may relate to, but not limited to, achieving load balancing on the radio access layer or on the backhaul, resolving contention, or realizing energy-saving on the backhaul.

According to another preferred embodiment the backhaul resource controller may be configured to acquire the load information on the radio access layer using the RESOURCE STATUS UPDATE message, particularly Hardware Load Indicator, Radio Resource Status, and Composite Available Capacity, as specified in the standardization document 3GPP TS 36.423 V11.4.0, "Technical Specification Group Radio Access Network; Evolved Universal Terrestrial Radio Access Network (E-UTRAN); X2 application protocol (X2AP), Release 11" (see in particular section 9.1.2.14). Additionally or alternatively the backhaul resource controller may acquire the load information on the radio access layer using the LOAD INFORMATION message, in particular interference indication information elements (see in particular section 9.1.2.1).

With regards to an efficient information management, the backhaul resource controller may use a coordination message to inform a base station about available resources on a target cell which are matched with available backhaul resources such that reported available resources on the target cell will not exceed available backhaul resources. In this case, the base station of a source cell may decide which user terminals can be handed over to the target cell based on the available resources as well as available measurement reports from the user terminals. As already indicated earlier, the process of deciding on (and enforcing) handovers of user terminals based on reported matching available resources may also be performed directly by the backhaul resource controller itself.

Advantageously, the backhaul resource controller may further monitor the exchanged backhaul data in order to identify flows that may be rerouted from a source to a target cell based on the available load information from the individual base stations. In this case, the handover may be suggested to the source cell using a coordination message.

According to a preferred embodiment the backhaul resource controller may use available measurement drive test (MDT) information elements (as specified in the standardization document 3GPP TS 37.320 "Technical Specification Group Radio Access Network; Evolved Universal Terrestrial Radio Access (E-UTRA) and Evolved Universal Terrestrial Radio Access Network (E-UTRAN); Radio measurement collection for Minimization of Drive Tests (MDT); Overall description, Release 11") in order to decide on the handover of a particular user terminal. As a result, by the backhaul resource controller exploiting MDT information, backhaul resource usage and user terminal mobility can be further optimized. Among others, the backhaul resource controller may reuse the available reference signal receive power (RSRP) or reference signal receive quality (RSRQ) in order to decide whether a user terminal or a group of user terminals may be handed over to another cell.

With respect to a high degree of flexibility and adaptability, it may be provided that the backhaul resource controller dynamically re-arranges the controlled subset of base stations. To this end the backhaul resource controller may use the ENB CONFIGURATION UPDATE message, as specified in the standardization document 3GPP TS 36.423 V11.4.0, "Technical Specification Group Radio Access Network; Evolved Universal Terrestrial Radio Access Network (E-UTRAN); X2 application protocol (X2AP), Release 11" (see in particular section 9.1.2.8).

If the backhaul resource controller encounters that within a certain cluster of base stations rather the radio access network capacity than the backhaul network capacity is the limited factor, it may be provided that then the backhaul resource controller re-activates base stations. This is of particular interest for an energy-efficient operation of the network where base stations are turned off for energy-saving reasons if they are not used. For the re-activation of shut down base stations based on backhaul-load information the backhaul resource controller may use the CELL ACTIVATION REQUEST, as specified in the standardization document 3GPP TS 36.423 V11.4.0, "Technical Specification Group Radio Access Network; Evolved Universal Terrestrial Radio Access Network (E-UTRAN); X2 application protocol (X2AP), Release 11" (see in particular section 9.1.2.20).

According to one embodiment the backhaul resource controller may be implemented as a dedicated entity that is specifically provided for the purpose of making handover decisions on the basis of load information acquired both from the radio access network and from the backhaul network. According to another embodiment it may be provided that the coordination of backhaul and radio resources is implemented as part of the Element Manager (as described in document Self Organizing Network "NEC's proposals for next-generation radio network management", White paper, NEC Corporation, February 2009, see in particular FIG. 2) which controls a set of base stations or using a direct connection between the backhaul resource controller and the Element Manager. In this case, existing coordination messages between the Element Manager and the network may be reused or extended to influence the radio resource allocation. Alternatively, the coordination of backhaul and radio resources can also be implemented as part of the Network Manager (as also described in the above document) or using a direct connection between the backhaul resource controller and the Network Manager. In this case, existing coordination messages between the Network Manager and the network may be reused or extended to influence the radio resource allocation.

FIG. 1 schematically illustrates a radio access management system in accordance with an embodiment of the present invention. The system comprises a radio access network, generally denoted 1, and a backhaul network, generally denoted 2. The radio access network 1 includes a number of base stations 3 which provide connectivity to user terminals 4. In FIG. 1, for the sake of simplicity, only one or two user terminals 4 are depicted per base station 3. However, as will be appreciated by those skilled in the art, in real scenarios each base station 3 typically serves a multitude of user terminals 4.

In accordance with the present invention the radio access management system illustrated in FIG. 1 comprises a backhaul resource control (BRC) 5 which is connected via a first interface $I_1$ to a local cluster 6 of base stations 3. In the illustrated embodiment, the cluster 6 of base stations 3 being under control of BRC 5 includes a total number of five base stations 3. However, as will be appreciated by those skilled in the art, the number of base stations 3 may be different. In particular, the cluster 6 can be dynamically modified in order to adapt the system to the current situation, e.g. the current load distribution. Via a second interface $I_2$ BRC 5 is connected to the backhaul network 2, i.e. to the local backhaul infrastructure which delivers the data to the base station cluster 6. As illustrated in FIG. 1, the backhaul infrastructure typically includes various backhaul aggregation hubs that aggregate backhaul traffic from multiple base stations 3 or other backhaul nodes.

It is assumed that the backhaul link capacities $C_1$-$C_5$ limit the maximum throughput on each backhaul link. It is noted that the solid lines indicate wired connections, such as optical fibre, whereas the dashed lines indicate wireless links, such as microwave or 60 GHz, for instance. FIG. 1 illustrates a scenario in which the sum of $C_1+C_2+C_3$ is limited by $C_{A1}$, while the sum of $C_4+C_5$ is limited by $C_{A2}$.

In accordance with embodiments of the present invention the BRC 5 acquires load information from the local base station cluster 6 via interface $I_1$ and from the connecting backhaul network 2 via interface $I_2$ in order to enforce (or at least suggest) handovers between source and target cells to resolve congestion on the backhaul network 2 and increase the actual throughput on the radio access network 1. For instance, in the scenario of FIG. 1 the load information regarding the current load on the radio access layer acquired by BRC 5 may reveal that the backhaul capacity of $C_{A1}$ is fully saturated. In this case, the BRC 5 may suggest that the user terminal $UE_1$, which is connected to the base station connected through $C_3$, could be handed over to the base station connected through $C_4$ in order to free up capacity on $C_3$ and therefore increase the capacity for the remaining user terminals connected through $C_{A1}$. In order to perform such a "backhaul motivated handover", the BRC 5 uses information from both the radio access network 1 and the backhaul network 2, which is described hereinafter in more detail.

As a pre-step, the BRC 5 could feed a "utility value" to each of the base stations 3 of the cluster 6, where the utility value represents the desirability of a particular base station 3 to accept further user terminals (for new connection requests or as part of handovers). The utility value is based on backhaul-motivated criteria such as backhaul load (on links directly or indirectly connected to the given base station 3) or energy saving goals. Specifically, the utility value assigned to a particular base station 3 of a base station cluster 6 may relate to the relative load of backhaul links to that particular base-station 3, as well as to the relative load of backhaul links to adjacent base-stations 3. Moreover, the utility value may relate to the absolute available load on backhaul links. As part of the normal handover procedure, base stations 3 could then take the utility value into consideration in order to make handover decisions with backhaul conditions in mind.

Figure 2:
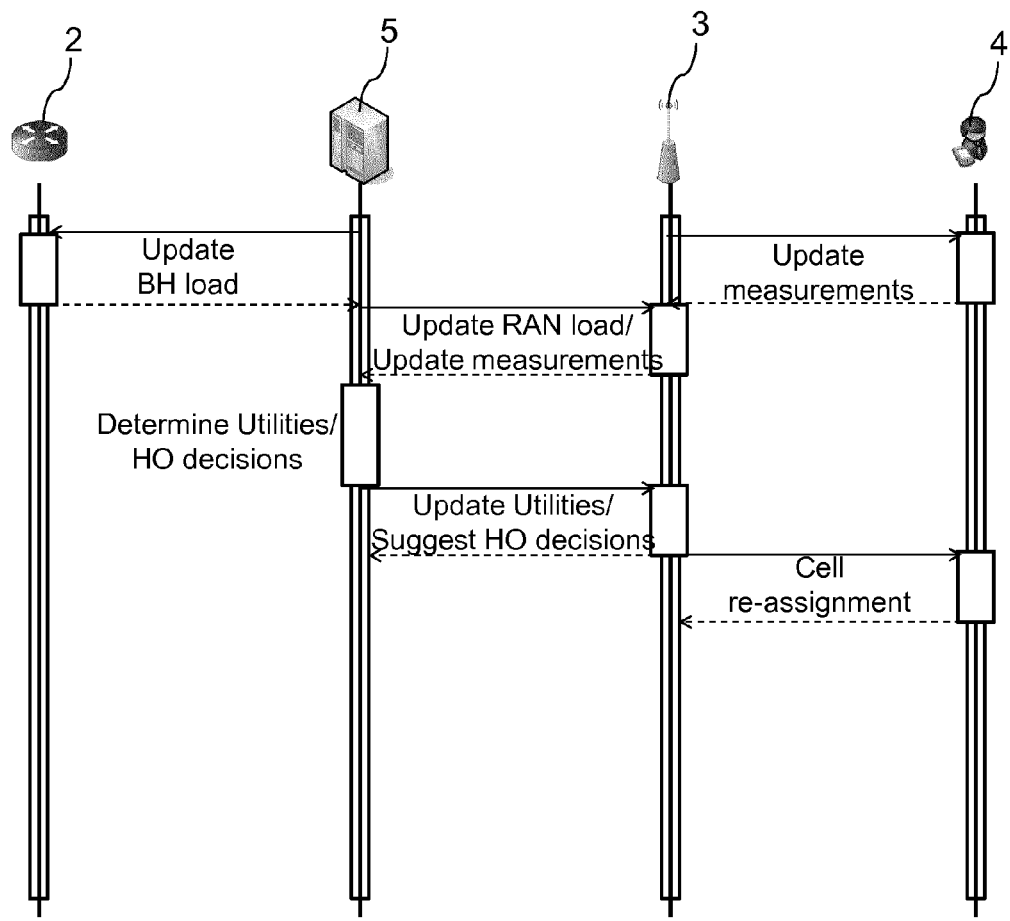
FIG. 2 is a flow chart showing message exchange flow in a method for performing radio access management in accordance with an embodiment of the present invention.

In FIG. 2, the radio access management method and system described above is illustrated as a flow chart. As can be seen, the BRC 5 updates its load information both with respect to the backhaul network 2 and with respect to the radio access network 1. As regards the radio access network 1 load information, the BRC 5 performs update measurements towards the base stations 3 belonging to the base station cluster 6 under its control. These update measurements rely on the results of update measurements performed by the base stations 3 towards connected user terminals 4. For instance, the BRC 5 may use a coordination message which requests user terminal specific load information from a source cell. In this case, the source cell, i.e. the respective base station, sends for all or a group of connected user terminals 4 the current load information. This load information may then be matched with the available backhaul capacity as well as the available capacity in potential target cells.

On the basis of the acquired load information, the BRC 5 determines appropriate utility values for the base stations 3 and transmits respective update messages to the base stations 3. In addition the BRC 5, taking into consideration the updated utility values, prepares handover decisions and transmits respective proposals/recommendations to the base stations 3. According to one embodiment the BRC 5 provides a list of user terminals 4 sorted according to the user terminals' 4 load. In this case, the BRC could initiate/propose a handover for each user terminal 4 one after the other until the preset objectives (e.g. resolving contention, energy-saving on the backhaul, etc.) are achieved. Based on the handover proposals received from the BRC 5, the base stations 3 may perform corresponding cell re-reassignments and give feedback to the BRC 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A radio access management system, comprising:
a radio access network including a number of base stations;
a backhaul network to which the base stations are connected via backhaul links, and
a backhaul resource controller configured to:
acquire information about both the load of the radio access network and of the backhaul network,
at least one of suggest or enforce handovers of user terminals connected to the base stations based on the acquired load information, and
assign, to each of the base stations, a utility value which represents the acceptability of that base station to which it is assigned to serve further user terminals.

2. The radio access management system according to claim 1, wherein the backhaul resource controller is connected via a first interface to a local cluster of base stations, wherein the local cluster of base stations includes at least a subset of the base stations.

3. The radio access management system according to claim 2, wherein the first interface is implemented as a logical interface towards the local cluster of base stations.

4. The radio access management system according to claim 2, wherein the backhaul resource controller is configured to dynamically re-arrange the local cluster of base stations.

5. The radio access management system according to claim 2, wherein the backhaul resource controller is configured to re-activate deactivated base stations when the radio access network within the local cluster of base stations has limited resources.

6. The radio access management system according to claim 1, wherein the backhaul resource controller is connected via a second interface to the backhaul network.

7. The radio access management system according to claim 1, wherein the utility value assigned to a base station relates to a relative load of backhaul links connecting to that base-station to which it assigned as well as to the relative load of backhaul links connecting to adjacent base-stations.

8. The radio access management system according to claim 1, wherein the utility value assigned to a base station relates to an absolute available load on backhaul links.

9. The radio access management system according to claim 1, wherein the utility value assigned to a base station relates to at least one of a lower or an upper bound for user traffic flows that is at least one of accepted or rejected at that base station to which it is assigned.

10. The radio access management system according to claim 1, wherein the base stations take into consideration their assigned utility value in order to make handover decisions.

11. The radio access management system according to claim 1, wherein the backhaul resource controller is configured to use a coordination message which requests user terminal specific load information from a source cell.

12. The radio access management system according to claim 1, wherein the backhaul resource controller is configured to acquire the information about the load of the radio access network using at least one of a RESOURCE STATUS UPDATE message or a LOAD INFORMATION message.

13. The radio access management system according to claim 1, wherein the backhaul resource controller is configured to use a coordination message to inform one or more of the base stations about available resources on a target cell.

14. The radio access management system according to claim 1, wherein the backhaul resource controller is configured to monitor exchanged backhaul data.

15. The radio access management system according to claim 1, wherein the backhaul resource controller is configured to use available measurement drive test information elements in order to decide on the handover of at least one of the user terminals.

16. The radio access management system according to claim 1, wherein the backhaul resource controller is implemented as a dedicated entity.

17. The radio access management system according to claim 1, wherein the backhaul resource controller is implemented as at least one of part of an Element Manager which controls a set of the base stations or part of a Network Manager.

18. A method for performing radio access management by employing a system including a radio access network including a number of base stations, a backhaul network to which the base stations are connected via backhaul links, and a backhaul resource controller, the method comprising:
acquiring, by the backhaul resource controller, information about both the load of the radio access network and of the backhaul network;
at least one of suggesting or enforcing, by the backhaul resource controller, handovers of user terminals connected to the base stations based on the acquired load information; and
assigning, to each of the base stations, a utility value which represents the acceptability of that base station to which it is assigned to serve further user terminals.

19. A backhaul resource controller for supporting radio access management in a radio access network including a number of base stations that are connected to a backhaul network via backhaul links, the backhaul resource controller comprising:
a first interface operable to acquire information about a load of the radio access network,
a second interface operable to acquire information about a load of the backhaul network, and
an evaluator operable to evaluate acquired load information and operable to at least one of suggest or enforce handovers of user terminals connected to the base stations based on the acquired load information, and further operable to assign, to each of the base stations, a utility value which represents the acceptability of that base station to which it is assigned to serve further user terminals.

* * * * *